United States Patent
Wang et al.

(10) Patent No.: US 12,209,871 B2
(45) Date of Patent: Jan. 28, 2025

(54) SYSTEMS, VEHICLES, AND METHODS FOR CREATING A VEHICLE NETWORK

(71) Applicant: Toyota Motor North America, Inc., Plano, TX (US)

(72) Inventors: Timothy Wang, Ypsilanti, MI (US); Roger Akira Kyle, Frisco, TX (US); Bryan Else Yamasaki, Ypsilanti, MI (US)

(73) Assignee: Toyota Motor North America, Inc., Plano, TX (US)

( * ) Notice: Subject to any disclaimer, the term of this patent is extended or adjusted under 35 U.S.C. 154(b) by 186 days.

(21) Appl. No.: 17/718,110

(22) Filed: Apr. 11, 2022

(65) Prior Publication Data

US 2023/0324184 A1 Oct. 12, 2023

(51) Int. Cl.
| | |
|---|---|
| G01C 21/34 | (2006.01) |
| G01C 21/36 | (2006.01) |
| H04W 4/40 | (2018.01) |
| H04W 4/80 | (2018.01) |

(52) U.S. Cl.
CPC ..... *G01C 21/3415* (2013.01); *G01C 21/3605* (2013.01); *H04W 4/40* (2018.02); *H04W 4/80* (2018.02)

(58) Field of Classification Search
None
See application file for complete search history.

(56) References Cited

U.S. PATENT DOCUMENTS

| | | | |
|---|---|---|---|
| 6,249,232 B1 | 6/2001 | Tamura et al. | |
| 6,868,333 B2 * | 3/2005 | Melen | G01C 21/3667 701/538 |
| 7,706,969 B2 | 4/2010 | Takagi et al. | |
| 2014/0278027 A1 * | 9/2014 | Burke | G08G 1/22 701/117 |
| 2018/0027476 A1 * | 1/2018 | Lei | H04W 40/246 455/419 |
| 2018/0032086 A1 * | 2/2018 | Punithan | G05D 1/0027 |
| 2020/0394923 A1 * | 12/2020 | Thompson | G08G 1/096816 |

(Continued)

FOREIGN PATENT DOCUMENTS

| | | |
|---|---|---|
| CN | 112738269 A | 4/2021 |
| JP | 2011186737 A | 9/2011 |
| JP | 2018005704 A | 1/2018 |

*Primary Examiner* — Todd Melton
(74) *Attorney, Agent, or Firm* — Snell & Wilmer LLP (57) ABSTRACT

Systems, vehicles, and methods for creating a vehicle network. A system includes a wireless transceiver of a master vehicle configured to broadcast a connectivity signal. The system further includes a wireless transceiver of a follower vehicle configured to receive the connectivity signal to wirelessly link the follower vehicle to the master vehicle. The wireless transceiver of the follower vehicle is further configured to transmit vehicle identifying information to the master vehicle upon the follower vehicle being linked to the master vehicle. The system further includes a remote server configured to receive the vehicle identifying information of the follower vehicle from the master vehicle and a vehicle identifying information of the master vehicle from the master vehicle to create a vehicle group. The vehicle group includes the master vehicle and the follower vehicle to enable data exchange within the vehicle group.

18 Claims, 7 Drawing Sheets

(56) References Cited

U.S. PATENT DOCUMENTS

2021/0099834 A1   4/2021  Mountford et al.
2023/0204365 A1*  6/2023  Ishida ................ G01C 21/3407
                                                            701/422

* cited by examiner

SYSTEMS, VEHICLES, AND METHODS FOR CREATING A VEHICLE NETWORK

BACKGROUND

1. Field

This specification relates to systems, vehicles, and methods for creating a vehicle network across multiple vehicles.

2. Description of the Related Art

Drivers may use navigation systems to navigate from their current location to a destination location. The navigation systems may provide a set of turn-by-turn directions for the driver to follow to get from the current location to the destination location. In some situations, the driver may be driving alongside a group of other drivers. For example, a group of drivers may be driving to a common travel stop, point of interest, or destination. However, these drivers may not know exactly where the other drivers are located, as driving speeds and styles vary across drivers. Drivers may use mobile devices, such as smartphones, to call or message the other drivers to coordinate travel stops, destinations, and routes to destinations, but the use of mobile devices while driving is not recommended, and in many jurisdictions, illegal. Further, existing systems that connect vehicles to a vehicle network may have security deficiencies and connection speed limitations. Thus, there is a need for an improved vehicle network.

SUMMARY

Examples described herein relate to systems, vehicles, and methods for creating a vehicle network. A system may create a vehicle network between a master vehicle and a follower vehicle. The master vehicle and the follower vehicle may each have a wireless transceiver. The wireless transceiver of the master vehicle may broadcast a connectivity signal. The wireless transceiver of the follower vehicle may receive the connectivity signal to wirelessly link the follower vehicle to the master vehicle. The wireless transceiver of the follower vehicle may further transmit vehicle identifying information to the master vehicle after the follower vehicle is wirelessly linked to the master vehicle. The system may further include a remote server that can receive both the vehicle identifying information of the follower vehicle and a vehicle identifying information of the master vehicle from the master vehicle. The remote server may then create a vehicle group including the master vehicle and the follower vehicle to enable data exchange within the vehicle group.

In one aspect, the disclosure is embodied in a system. The system includes a wireless transceiver of a master vehicle that broadcasts a connectivity signal. The system further includes a wireless transceiver of a follower vehicle that receives the connectivity signal to wirelessly link the follower vehicle to the master vehicle and transmit vehicle identifying information to the master vehicle upon the follower vehicle being linked to the master vehicle. The system further includes a remote server. The remote server receives the vehicle identifying information of the follower vehicle from the master vehicle and a vehicle identifying information of the master vehicle from the master vehicle to create a vehicle group. The vehicle group includes the master vehicle and the follower vehicle and enables data exchange within the vehicle group.

These and other embodiments may optionally include one or more of the following features. The connectivity signal may be a Bluetooth low energy (BLE) signal. The system may further include an input/output unit of the follower vehicle. The input/output unit may prompt a user of the follower vehicle to agree to share data with the vehicle group prior to the remote server including the follower vehicle in the vehicle group. The data exchange may include a member of the vehicle group suggesting or setting a travel route, a travel destination, or a travel stop for the vehicle group. The data exchange may further include the member or another member of the vehicle group suggesting or making a change to the travel route, the travel destination, or the travel stop. The data exchange may further include a voice message. The data exchange may further include a member of the vehicle group sharing a current location with the vehicle group. The system may further include an electronic control unit (ECU) of the master vehicle and the follower vehicle. The ECU may determine navigation directions based on the travel route, to the travel destination, or to the travel stop. The system may further include an input/output unit of the master vehicle or the follower vehicle. The input/output unit may prompt a user of the master vehicle or the follower vehicle to agree to the change to the travel route, the travel destination, or the travel stop before the ECU of the master vehicle and the follower vehicle changing the travel route or the navigation directions to the travel destination or the travel stop. The input/output unit of the master vehicle or the follower vehicle may receive input and output voice messages. The system may further include a display of the master vehicle or the follower vehicle that displays the current location.

In another aspect, the disclosure is embodied in a first vehicle. The first vehicle includes a memory that stores first vehicle identifying information of the first vehicle. The first vehicle further includes a wireless transceiver. The wireless transceiver broadcasts a connectivity signal receivable by a wireless transceiver of a second vehicle to wirelessly link the second vehicle to the first vehicle. The wireless transceiver further receives second vehicle identifying information from the second vehicle upon the second vehicle being linked to the first vehicle. The wireless transceiver further transmits the second vehicle identifying information of the second vehicle and the first vehicle identifying information of the first vehicle to a remote server to create a vehicle group including the first vehicle and the second vehicle. The wireless transceiver further exchanges data within the vehicle group.

These and other embodiments may optionally include one or more of the following features. A digital agreement to share data within the vehicle group may be required by at least the second vehicle before the remote server creating the vehicle group. The vehicle may further include an input/output unit that may receive user input of a travel route, a travel destination, or a travel stop for the vehicle group. The vehicle may further include an ECU coupled to the input/output unit. The ECU may determine navigation directions based on the travel route, to the travel destination, or to the travel stop. The data may include the travel route, the travel destination, or the travel stop for an ECU of the second vehicle to determine navigation directions based on the travel route, to the travel destination, or to the travel stop. The data may also include a suggestion or a change to the travel route, the travel destination, or the travel stop. A digital agreement to the change to the travel route, the travel destination, or the travel stop may be required by at least the second vehicle before the ECU of the first vehicle and the ECU of the second vehicle change the travel route or the navigation directions to the travel destination or the travel stop.

The first vehicle may further include an input/output unit that may receive input and output a voice message. The data may include the voice message. The data may also include a current location of the first vehicle and the second vehicle. The vehicle may further include a display that may display the current location of the first vehicle and the second vehicle. The connectivity signal may be a BLE signal.

In yet another aspect, the disclosure is embodied in a method. The method may include broadcasting a connectivity signal by a wireless transceiver of a master vehicle. The method may further include receiving the connectivity signal to wirelessly link the follower vehicle to the master vehicle by a wireless transceiver of the follower vehicle. The method may further include transmitting vehicle identifying information to the master vehicle upon the follower vehicle being linked to the master vehicle by the wireless transceiver of the follower vehicle. The method may further include receiving the vehicle identifying information of the follower vehicle from the master vehicle and a vehicle identifying information of the master vehicle from the master vehicle by a remote server. The method may further include creating a vehicle group including the master vehicle and the follower vehicle based on the vehicle identifying information of the master vehicle and the vehicle identifying information of the follower vehicle to enable data exchange within the vehicle group by the remote server.

These and other embodiments may optionally include one or more of the following features. The method may further include suggesting or setting a travel route, a travel destination, or a travel stop for the vehicle group by an input/output unit of the master vehicle or the follower vehicle. The method may further include determining navigation directions based on the travel route, to the travel destination, or to the travel stop by an ECU of the master vehicle or the follower vehicle.

The method may further include suggesting or performing a change to the travel route, the travel destination, or the travel stop by the input/output unit of the master vehicle or the follower vehicle. The method may further include prompting a user of the master vehicle or the follower vehicle to agree to the suggested or set travel route, travel destination, or travel stop or suggested or performed change to the travel route, the travel destination, or the travel stop by the input/output unit of the master vehicle or the follower vehicle.

BRIEF DESCRIPTION OF THE DRAWINGS

Other systems, methods, features, and advantages of the present invention will be apparent to one skilled in the art upon examination of the following figures and detailed description. Component parts shown in the drawings are not necessarily to scale, and may be exaggerated to better illustrate the important features of the present invention.

DETAILED DESCRIPTION

Disclosed herein are systems, vehicles, and methods for creating a vehicle network between multiple vehicles. The systems, vehicles, and methods described herein allow a first vehicle or a master vehicle to broadcast a connectivity signal and a second vehicle or a follower vehicle to receive that signal and wirelessly connect to the master vehicle. Additional vehicles, for example, a third vehicle, a fourth vehicle, a fifth vehicle, etc. may also be included as vehicle group members. The connectivity signal may advantageously be a BLE signal, which allows for low-power consumption and fast and interference resistant data exchange.

Upon the connection being established, the follower vehicle (e.g., the second vehicle) may transmit vehicle identifying information (e.g., VIN number, license plate number, registration number, make/model, etc.) to the master vehicle. The systems, vehicles, and methods described herein further allow a server remote from the master and follower vehicles to receive the vehicle identifying information of both the master vehicle and the follower vehicle to create a vehicle group or a vehicle network based on the received vehicle identifying information. The vehicle group may then allow the vehicle group members to safely and quickly exchange data among each other.

Members of the vehicle group may advantageously suggest or set travel routes, travel destinations, and/or travel stops for the vehicle group's consideration or for the vehicle group, respectively. Further, members of the vehicle group may advantageously suggest an alternative to or change a previously suggested or set travel route, travel destination, and/or travel stop. ECUs of the vehicles in the vehicle group may determine navigation directions based on the suggested, set, alternatively suggested, or changed travel route, travel destination, and/or travel stop. Members of the vehicle group may also share their respective locations with each other. Additionally, the members of the vehicle group may send and receive voice messages among themselves, thereby securely and safely communicating without having to use mobile phones, walkie-talkies, CB radios, and the like.

Conventional systems do not allow for the shared communication of information between vehicles regarding routes to a common destination. Drivers may use mobile devices, such as smartphones to call or text the other drivers to coordinate locations and possible stops, but the use of mobile devices while driving is not recommended, and in many jurisdictions, illegal. The systems, vehicles, and methods described herein improve safety as well as improve vehicle efficiency by having all of the vehicles in the synchronized group of vehicles aware of the location data and route data of the other vehicles.

As used herein, "driver" may refer to a human being driving the vehicle when the vehicle is a non-autonomous vehicle, and/or "driver" may also refer to one or more computer processors used to autonomously or semi-autonomously drive the vehicle. "User" may be used to refer to the driver or occupant of the vehicle when the vehicle is a non-autonomous vehicle, and "user" may also be used to refer to an occupant of the vehicle when the vehicle is an autonomous or semi-autonomous vehicle.

Figure 1:
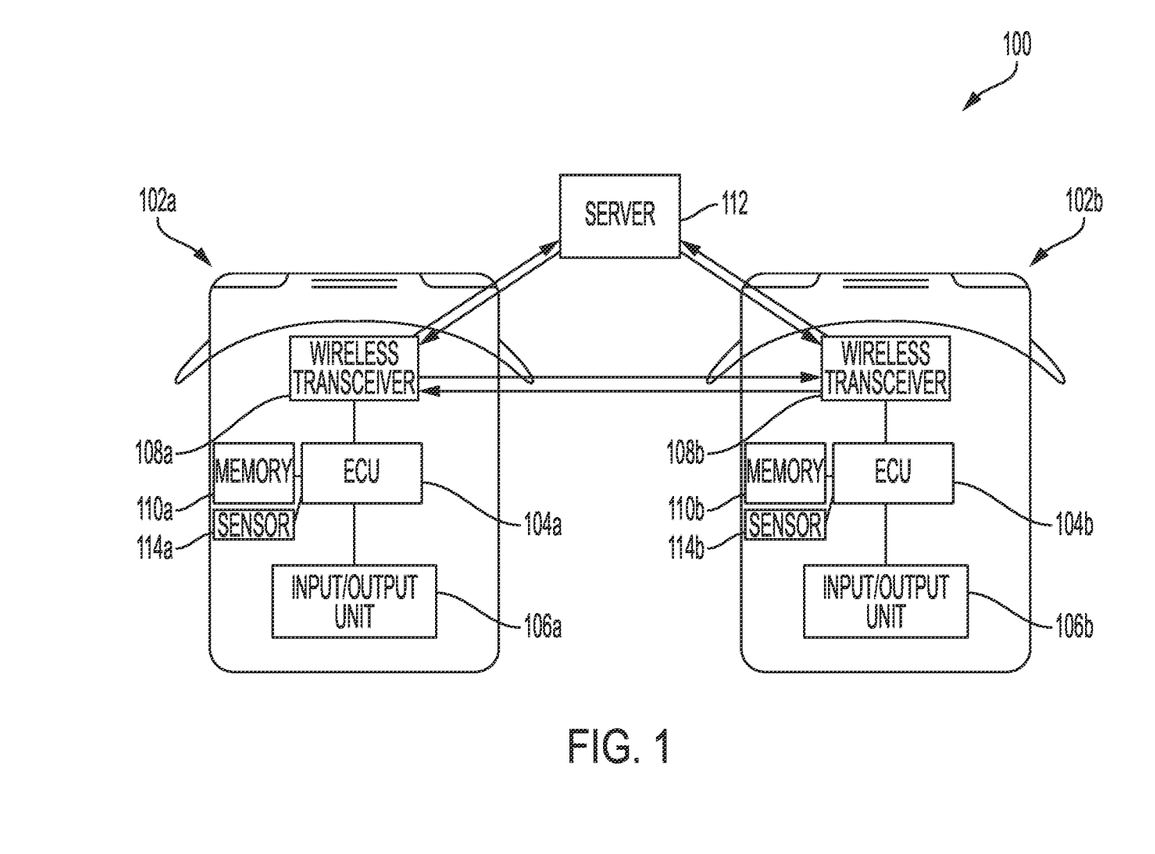
FIG. 1 illustrates a schematic of a system for creating a vehicle network between a master vehicle and a follower vehicle according to an aspect of the present disclosure.

FIG. 1 illustrates a schematic of a system 100 for creating a vehicle network between a master vehicle 102a and a follower vehicle 102b. The vehicles 102a,b are conveyances capable of transporting a person, an object, or a permanently or temporarily affixed apparatus. The vehicles 102a,b may be a self-propelled wheeled conveyance, such as a car, a sports utility vehicle, a truck, a bus, a van, a motorcycle, or other motor or battery driven vehicle. For example, the vehicles 102a,b may be an electric vehicle, a hybrid vehicle, a plug-in hybrid vehicle, a fuel cell vehicle, or any other type of vehicle that includes a motor/generator. Other examples of vehicles include bicycles, trains, planes, or boats, and any other form of conveyance that is capable of transportation. The vehicles 102a,b may have an automatic and/or manual transmission. The vehicles 102a,b may be a semi-autonomous vehicle or an autonomous vehicle. That is, the vehicles 102a,b may be self-maneuvering and navigate without human input. An autonomous vehicle may use one or more sensors and/or a navigation unit to drive autonomously.

The master vehicle 102a may include an ECU 104a, an input/output unit 106a, a wireless transceiver 108a, a memory 110a, and a sensor 114a. The follower vehicle 102b may include an ECU 104b, an input/output unit 106b, a wireless transceiver 108b, a memory 110b, and a sensor 114b.

The ECUs 104a,b may each be one or more ECUs, appropriately programmed, to control one or more operations of the vehicles 102a,b. The ECUs 104a,b may each be implemented as a single ECU or in multiple ECUs. The ECUs 104a,b may be electrically coupled to some or all of the components of the vehicles 102a,b. In some embodiments, each of the ECUs 104a,b is a central ECU configured to control one or more operations of the vehicles 102a,b in entirety. In some embodiments, each of the ECUs 104a,b is multiple ECUs located within the vehicles 102a,b and each configured to control one or more local operations of the vehicles 102a,b. In some embodiments, each of the ECUs 104a,b is one or more computer processors or controllers configured to execute instructions stored in each of the non-transitory memories 110a,b.

The vehicles 102a,b may be coupled to a network. The couplings may be facilitated by the wireless transceivers 108a,b. The network, such as a local area network (LAN), a wide area network (WAN), a cellular network, a digital short-range communication (DSRC), the Internet, or a combination thereof, may connect the vehicles 102a,b to a remote server 112.

The wireless transceivers 108a,b may include a communication port or channel, such as one or more of a Wi-Fi® unit, a conventional Bluetooth® unit, a Bluetooth® Low Energy unit, a Radio Frequency Identification (RFID) tag or reader, a DSRC unit, and/or a cellular network unit for accessing a cellular network (such as 4G or 5G). The wireless transceivers 108a,b may transmit data to and receive data from devices and systems not directly connected to the vehicles 102a,b. The wireless transceivers 108a,b may communicate with each other and with the remote server 112. Furthermore, the wireless transceivers 108a,b may access the network, to which the remote server 112 is also connected. In some embodiments, only one of the vehicles 102a,b may communicate directly with the remote server 112. Specifically, the master vehicle 102a may communicate directly with the remote server 112 and the follower vehicle 102b may communicate with the remote server 112 through the master vehicle 102a. The vehicles 102a,b may communicate with each other directly or via the network.

The sensors 114a,b may include a location sensor. In some embodiments, the sensors 114a,b may further include conventional vehicle sensors such as temperature sensors, pressure sensors, level sensors (e.g., for oil, gas, wiper fluid, etc.), airflow sensors, and autonomous vehicle sensors (e.g., radar, lidar, cameras, etc.). The sensors 114a,b may each be connected to the ECUs 104a,b, respectively, and configured to determine location data. The location sensor may be a global positioning system (GPS) unit or any other global location detection device. Each of the ECUs 104a,b may use location data of their respective vehicles along with map data stored in each of the memories 110a,b to determine a location of their respective vehicles. In other embodiments, each of the sensors 114,b may have access to map data and may determine the location of their respective vehicle and provide the location of their respective vehicle to their respective ECUs 104a,b. In some embodiments, the location data of each of the vehicles 102a,b may be received from another device (e.g., mobile device, another vehicle, etc.) via the respective wireless transceivers 108a,b of the vehicles 102a,b.

The memories 110a,b may each be connected to the ECUs 104a,b, respectively, and may be connected to any other component of the vehicles 102a,b, respectively. The memories 110a,b are configured to store any data described herein, such as travel routes, travel destinations, travel stops, voice messages, and location data as well as any data received from the remote server 112 via the wireless transceivers 108a,b.

The input/output units 106a,b may each be a touchscreen display, a display screen, a speaker, a haptic feedback motor, and an input device, such as a keyboard, a microphone, a camera, or buttons. The input/output units 106a,b may be a touchscreen of an infotainment unit of the vehicles 102a,b, respectively, a heads-up display, or a combination of a display screen of the infotainment unit and one or more buttons or knobs used to interact with the infotainment unit. The ECUs 104a,b may be configured to render a graphical user interface to facilitate displaying of notifications, prompts, travel options (e.g., travel route, travel destination, travel stop), navigation directions, and vehicle locations by example. The graphical user interface may also facilitate the communication of suggestions and counter suggestions of travel options from a member vehicle to the vehicle group.

The input/output units 106a,b may include a speaker and a microphone to transmit and receive a voice message or make a call. Audio may be captured through the microphone of one vehicle and relayed to another vehicle or vehicles through its or their speakers. The transmission of the voice message or the call may be within the vehicle group and through the remote server 112.

The ECUs 104a,b, their respective input/output units 106a,b, and their respective sensors 114a,b may work in concert to provide location data to a user of each of the vehicles 102a,b and provide navigation directions from a current location to one or more destinations or stops.

To create a vehicle network, first, the wireless transceiver 108a may broadcast a connectivity signal. The connectivity signal may be a BLE beacon signal that reaches to nearby BLE compatible devices. In some embodiments, the connectivity signal may be compatible with Zigbee®, Z-Wave, 6LoWPAN, and the like. The nearby devices may then take an action in response to the connectivity signal.

The wireless transceiver 108b may be compatible with the connectivity signal. Hence, the wireless transceiver 108b may receive the connectivity signal. When the wireless transceiver 108b receives the connectivity signal, the wireless transceiver 108a and the wireless transceiver 108b may be linked. Hence, the master vehicle 102a and the follower vehicle 102b may be wirelessly linked. Prior to linking the wireless transceiver 108b to the wireless transceiver 108a, the ECU 104b may prompt the input/output unit 106b to prompt a user of the follower vehicle 102b to agree to be linked to the wireless transceiver 108a. For example, an alert, a notification, an icon, and/or a verbal question may be prompted to the user to react or respond to.

Once the wireless transceiver 108a and the wireless transceiver 108b are linked, the wireless transceiver 108b may transmit vehicle identifying information to the wireless transceiver 108a. Vehicle identifying information may include a VIN number, a vehicle make and/or model, a license plate number, or a vehicle registration number by example. The vehicle identifying information may be stored in and retrieved from the memory 110b or in a cloud server. In some embodiments, the user may be asked to provide the vehicle identifying information and provide the vehicle identifying information via the input/output unit 106b.

Once the vehicle identifying information is transmitted to the wireless transceiver 108a, the memory 110a may store the vehicle identifying information. In addition, or in lieu, the memory 110a may store the vehicle identifying information of the master vehicle 102a. In some embodiments, the vehicle identifying information of the master vehicle 102a may also be stored in and retrieved from a cloud server.

The remote server 112 may receive the vehicle identifying information of both the master vehicle 102a and the follower vehicle 102b from the master vehicle 102a via the wireless transceiver 108a. Upon receiving the vehicle identifying information of both the master vehicle 102a and the follower vehicle 102b, the remote server 112 may create a vehicle group that includes the master vehicle 102a and the follower vehicle 102b via a processor or processors of the remote server 112. When the vehicle group is created on the remote server 112, the master vehicle 102a and the follower vehicle 102b may exchange data within the vehicle group through the remote server 112. The vehicle group may be exclusive to the member vehicles, encrypted, and require the aforementioned protocols to join. As such, the vehicle group may be a secure and efficient method to exchange data.

While only the master vehicle 102a and the follower vehicle 102b are shown in FIG. 1, any number of vehicles greater than one may be used and join the vehicle group. However, in some embodiments, at least one vehicle may have to be designated as a master vehicle and have additional features and roles available exclusive to the master vehicle 102a, which will be discussed in greater detail. Likewise, while only one remote server 112 is shown, any number of remote servers in communication with each other may be used.

Figures 2, 3:
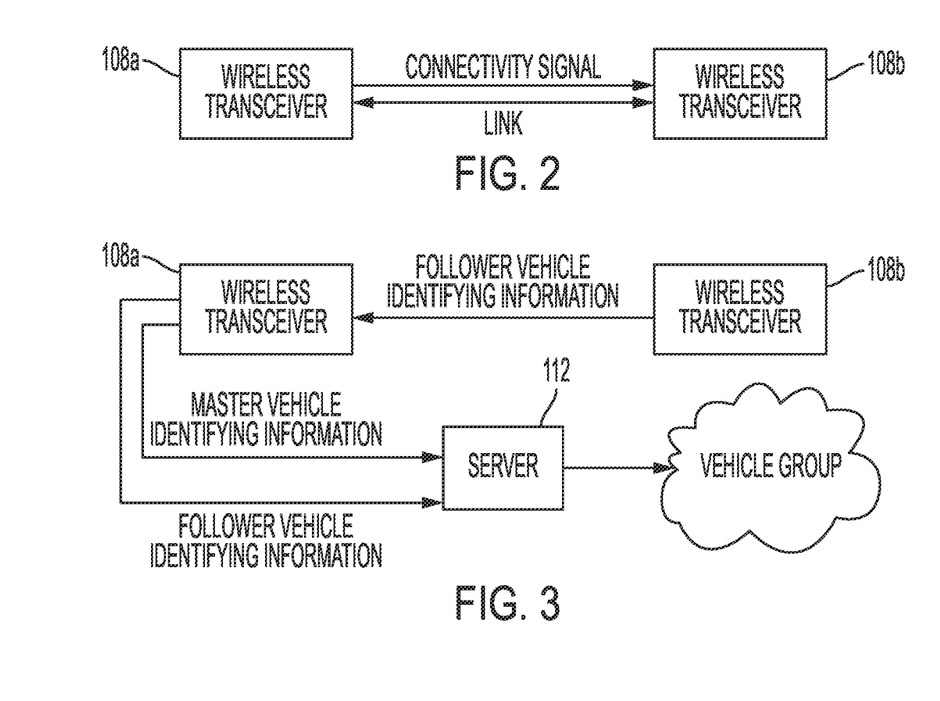
FIG. 2 illustrates a schematic of a follower vehicle being wirelessly linked to a master vehicle of the system of FIG. 1 according to an aspect of the present disclosure.
FIG. 3 illustrates a schematic of a remote server of the system of FIG. 1 creating a vehicle group according to an aspect of the present disclosure.

FIG. 2 illustrates a schematic of a follower vehicle 102b (see FIG. 1) being wirelessly linked to a master vehicle 102a (see FIG. 1). A wireless transceiver 108a of the master vehicle 102a may broadcast a connectivity signal. The connectivity signal may be a BLE beacon signal that reaches to nearby BLE compatible devices. In some embodiments, the connectivity signal may be compatible with Zigbee®, Z-Wave, 6LoWPAN, and the like.

A wireless transceiver 108b of the follower vehicle 102b (see FIG. 1) may be compatible with the connectivity signal. Hence, the wireless transceiver 108b may receive the connectivity signal. For example, for BLE 4.0 and 4.1 devices, when the wireless transceiver 108b receives the connectivity signal, the wireless transceivers 108a,b may exchange I/O capabilities, authentication requirements, maximum link key size, and bonding requirements in order to establish a secure connection. Then, the wireless transceivers 108a,b may generate and/or exchange a temporary key (TK) via a selected pairing method. Thereafter, the wireless transceivers 108a,b may verify that they are using the same TK. Upon verification, the wireless transceivers 108a,b may create a short term key (STK) based on the TK to encrypt the wireless connection between the wireless transceivers 108a, b. In another example, for BLE 4.2 devices, the process for BLE 4.0 and 4.1 devices may occur or a long-term key (LTK) may be used in lieu of an STK to encrypt the connection.

After an encrypted connection is established, the wireless transceiver 108a and the wireless transceiver 108b may be considered linked or paired. Hence, the master vehicle 102a (see FIG. 1) and the follower vehicle 102b may be wirelessly linked. Once the master vehicle 102a and the follower vehicle 102b are linked, they may recognize each other and pair without having to perform any, some, or all previously performed steps during initial pairing. The wireless connection between the master vehicle 102a and the follower vehicle 102b may be a point-to-point connection where data exchange between the master vehicle 102a and the follower vehicle 102b do not have to travel via the Internet or a large network. The master vehicle 102a and the follower vehicle 102b may have to be within a required distance of each other in order to successfully pair. For example, the required distance may be between and including one (1) foot and sixty (60) feet by example.

FIG. 3 illustrates a schematic of a remote server 112 of the system 100 (see FIG. 1) creating a vehicle group. The wireless transceiver 108b may transmit vehicle identifying information to the wireless transceiver 108a following the linking or the pairing. Once the vehicle identifying information is transmitted to the wireless transceiver 108a, the wireless transceiver 108a may transmit the vehicle identifying information of both the master vehicle 102a and the follower vehicle 102b to the remote server 112. Upon receiving the vehicle identifying information of both the master vehicle 102a and the follower vehicle 102b, the remote server 112 may create a vehicle group that includes the master vehicle 102a and the follower vehicle 102b via a processor or processors of the remote server 112. When the vehicle group is created on the remote server 112, the master vehicle 102a and the follower vehicle 102b may exchange data within the vehicle group through the remote server 112.

Figure 4:
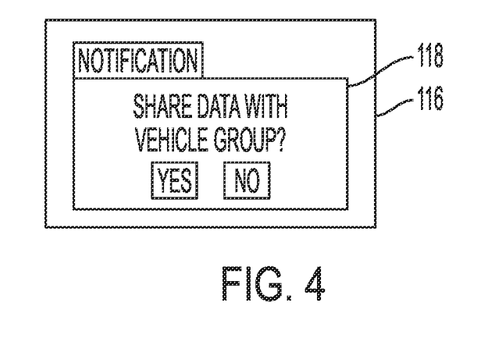
FIG. 4 illustrates a display of the follower vehicle of the system of FIG. 1 prompting a user to agree to share data with the vehicle group according to an aspect of the present disclosure.

FIG. 4 illustrates a display 116 of the follower vehicle 102b (see FIG. 1) prompting a user to agree to share data with the vehicle group. In other examples, the display 116 may be a display of the master vehicle 102a or any other member vehicle of the vehicle group. The display 116 may be part of the input/output unit 106b or be a separate device of the follower vehicle 102b. The display 116 may be a center display unit, an infotainment unit, or a display which may be located on a variety of locations (e.g., a gauge cluster, a rear-view mirror, a headrest, etc.) on the follower vehicle 102b. The display 116 may be a liquid crystal display (LCD), a light-emitting diode display (LED), an organic light emitting diode (OLED), a plasma display, a cathode-ray tube (CRT) display, a digital light processing display (DLPT), a microdisplay, a projection display, or any other conventional display. The display 116 may be touchscreen and receive user input through touch commands. In addition, or in lieu of, the display 116 may receive user input through physical buttons, keys, knobs, and/or the like.

The display 116 may display a user interface where the user may input and/or receive data. For example, the user may interact with menus, settings, buttons, keys, icons, options, alerts, notifications, and/or the like. In FIG. 4, an exemplary notification or an option tab 118 is presented to the user where the user may choose between sharing or not sharing data with the vehicle group by selecting "yes" or "no" options that appear on the display 116, respectively. This option tab 118 may be presented to the user prior to the remote server 112 including the follower vehicle 102b in the vehicle group. If the user elects not to share data with the vehicle group, then the follower vehicle 102b is not included in the vehicle group.

Figure 5:
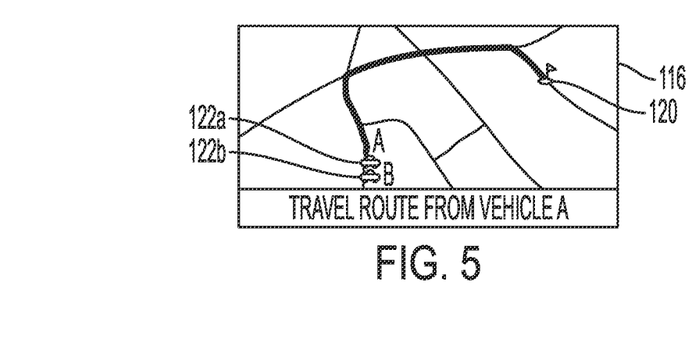
FIG. 5 illustrates the display of FIG. 4 displaying a travel route shared with the vehicle group according to an aspect of the present disclosure.

FIG. 5 illustrates the display 116 displaying a travel route shared with the vehicle group. The travel route may be one of the many examples of data shared with the vehicle group. For example, a driver may want to inform another driver of the vehicle group of a preferred route to arrive at their common destination. The preferred route may be based on an estimated time of arrival, road length, easier driving roads, freeway driving roads, toll roads, and/or road work by example. Other examples of data exchange will be discussed below.

The master vehicle 102a (see FIG. 1) or the follower vehicle 102b (see FIG. 1) may be sharing the travel route with the vehicle group. In some examples, only the master vehicle 102a may be allowed to share data, including a current location of the master vehicle 102a and the travel route with the vehicle group. This may keep the data exchange streamlined and organized. In some examples, the shared travel route may be a suggestion where other member vehicles of the vehicle group have to approve the travel route before navigation directions are set to or changed to the shared travel route. In some examples, the shared travel route may be a command where navigation directions of other member vehicles are automatically changed to guide the other member vehicles on the shared travel route.

The vehicle sharing the travel route is referred to as "vehicle A" in FIG. 5. The other vehicle in the vehicle group, which may be the follower vehicle 102b, is referred to as "vehicle B" in FIG. 5. The travel route may be a route from a first location to a second location. The first location may be a current location of the master vehicle 102a and/or the follower vehicle 102b. The current location of vehicle A and vehicle B are shown by car icons 122a,b, respectively, by example. The second location may be a destination or a stop.

Figure 6:
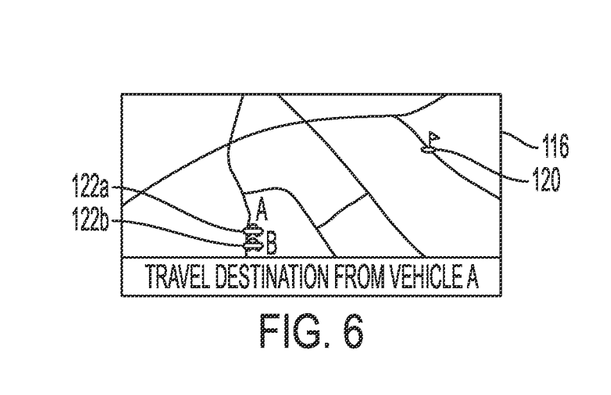
FIG. 6 illustrates the display of FIG. 4 displaying a travel destination shared with the vehicle group according to an aspect of the present disclosure.
Figure 7:
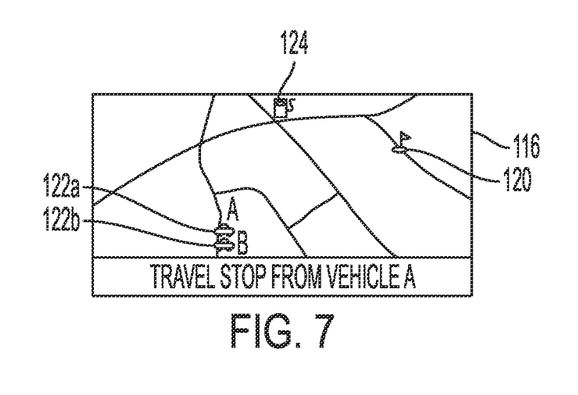
FIG. 7 illustrates the display of FIG. 4 displaying a travel stop shared with the vehicle group according to an aspect of the present disclosure.

The second location is shown by a flag icon 120 in FIGS. 5-7 as an example. The current location of vehicle A and vehicle B, the travel route, and the second location may be overlaid over a map. The map may be stored in the memory 110b (see FIG. 1), the remote server 112 (see FIG. 1), or shared with the vehicle group by a member vehicle. The ECU 104b (see FIG. 1) of the follower vehicle 102b may determine navigation directions based on the shared travel route. The navigation directions may be output by the input/output unit 106b (see FIG. 1) and/or the display 116.

FIG. 6 illustrates the display 116 displaying a travel destination shared with the vehicle group. The travel destination may be another example of data shared with the vehicle group. For example, a driver may want to or have to inform another driver where they will meet or have to go.

The master vehicle 102a (see FIG. 1) or the follower vehicle 102b (see FIG. 1) may be sharing the travel destination with the vehicle group. In some examples, only the master vehicle 102a may be allowed to share a travel destination. This may allow for a driver of the vehicle group to assume a leader role and increase efficiency of decision making within the vehicle group. In some examples, the shared travel destination may be a suggestion where other member vehicles of the vehicle group have to approve the travel destination before navigation directions are set to or changed to the shared travel destination. In some examples, the shared travel destination may be a command where navigation directions of other member vehicles are automatically changed to guide the other member vehicles to the shared travel destination.

The vehicle sharing the travel destination is referred to as "vehicle A" in FIG. 6. The other vehicle in the vehicle group, which may be the follower vehicle 102b, is referred to as "vehicle B" in FIG. 6. The travel destination may be an address, a set of coordinates, a point of interest, and/or the like. The travel destination is shown by the flag icon 120. The current location of the master vehicle 102a and/or the follower vehicle 102b may also be shared with the vehicle group and visible on the display 116. The current location of vehicle A and vehicle B are shown by the car icons 122a,b in FIG. 6. The current location of vehicle A and vehicle B and the travel destination may be overlaid over a map. The map may be stored in the memory 110b (see FIG. 1), the remote server 112 (see FIG. 1), or shared with the vehicle group by a member vehicle. The ECU 104b (see FIG. 1) of the follower vehicle 102b may determine navigation directions based on the shared travel destination. The navigation directions may be output by the input/output unit 106b (see FIG. 1) and/or the display 116.

FIG. 7 illustrates the display 116 displaying a travel stop shared with the vehicle group. The travel destination may be another example of data shared with the vehicle group. For example, a driver may want to or have to stop at a point of interest such as a gas station or a restaurant along the way to a destination or while following a travel route. In another example, a driver may need to stop at an address to pick up or drop off a passenger along the way to a destination or while following a travel route. There may be a plurality of travel stops shared by the same driver or different drivers.

The master vehicle 102a (see FIG. 1) or the follower vehicle 102b (see FIG. 1) may be sharing the travel stop with the vehicle group. In some examples, only the master vehicle 102a may be allowed to share a travel stop. This may allow for a driver of the vehicle group to assume a leader role and increase efficiency of decision making within the vehicle group. In some examples, the shared travel stop may be a suggestion where other member vehicles of the vehicle group have to approve the travel stop before navigation directions are set to or changed to the shared travel stop. In some examples, the shared travel stop may be a command where navigation directions of other member vehicles are automatically changed to guide the other member vehicles to the shared travel stop.

The vehicle sharing the travel stop is referred to as "vehicle A" in FIG. 7. The other vehicle in the vehicle group, which may be the follower vehicle 102b, is referred to as "vehicle B" in FIG. 7. The travel stop may be an address, a set of coordinates, a point of interest, and/or the like. The travel stop is shown by the gas station icon 124. The current location of the master vehicle 102a and/or the follower vehicle 102b may also be shared with the vehicle group and visible on the display 116. The current location of vehicle A and vehicle B are shown by the car icons 122a,b in FIG. 7. The current location of vehicle A and vehicle B and the travel destination may be overlaid over a map. The map may be stored in the memory 110b (see FIG. 1), the remote server 112 (see FIG. 1), or shared with the vehicle group by a member vehicle. The ECU 104b (see FIG. 1) of the follower vehicle 102b may determine navigation directions based on the shared travel stop. The navigation directions may be output by the input/output unit 106b (see FIG. 1) and/or the display 116.

Figure 8:
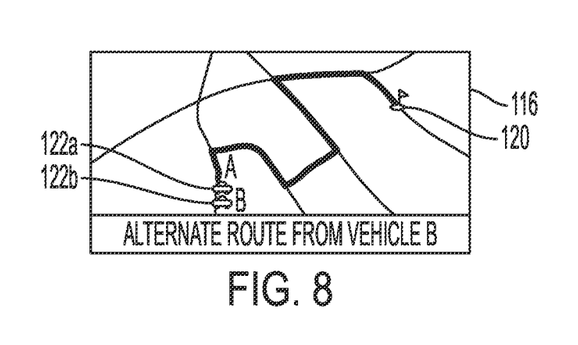
FIG. 8 illustrates the display of FIG. 4 displaying an alternate travel route shared with the vehicle group according to an aspect of the present disclosure.

FIG. 8 illustrates a display 116 displaying an alternate travel route shared with the vehicle group. The alternate travel route may be proposed or set by a member vehicle in response to a previously proposed travel route by the same member vehicle that made the previous proposal or another member vehicle. For example, a driver may want to inform the vehicle group of an alternative route that the driver thinks is superior to a previously suggested route and/or the driver wishes to take the alternative route to arrive at their common destination. The member vehicles that the alternative route is being proposed to may accept or decline the alternative route or may choose between one or more previously proposed routes and the proposed alternative route. If only two vehicles are present in the vehicle group and no agreement is reached, the route suggested by the master vehicle 102a (see FIG. 1) may be the selected travel route. Alternatively, if no agreement is reached, no particular travel route may be selected and the vehicle group may be dissolved. If more than two vehicles are present in the vehicle group, a voting of the suggested routes may take place. The route that receives the majority vote may be selected as the travel route. If there is a tie, a revote may take place, the master vehicle 102a may select the travel route, no particular travel route may be selected, or the vehicle group may be dissolved. The selections, voting, and/or revoting may be performed through the input/output units 106a,b (see FIG. 1) and/or the display 116 of the member vehicles of the vehicle group.

The master vehicle 102a (see FIG. 1) or the follower vehicle 102b (see FIG. 1) may be sharing the alternative travel route with the vehicle group. The vehicle sharing the alternative travel route is referred to as "vehicle B" in FIG. 8. The other vehicle in the vehicle group, which may be the master vehicle 102a, is referred to as "vehicle A" in FIG. 8. The alternative travel route may be a route from a first location to a second location. The first location and the second location may be same as those depicted in FIG. 5. The first location may be a current location of the master vehicle 102a and/or the follower vehicle 102b. The current location of vehicle A and vehicle B are shown by car icons 122a,b, respectively, by example. The second location may be a destination or a stop. The second location is shown by a flag icon 120 in FIGS. 8-10 as an example. The current locations of vehicle A and vehicle B, the alternate travel route, and the second location may be overlaid over a map. In some examples, the prior suggested route may also be displayed over the map. For instance, a different color or type of contour (e.g., dashed lines, dotted lines, dot-dashed lines, etc.) may be used to indicate the prior suggested route. Hence, drivers of the member vehicles may compare and contrast all suggested travel routes before making a selection. The map may be stored in the memory 110a (see FIG. 1), the remote server 112 (see FIG. 1), or shared with the vehicle group by a member vehicle. If the alternative travel route is selected by the vehicle group, the ECUs of the member vehicles, such as the ECU 104a (see FIG. 1), may determine navigation directions based on the shared alternative travel route. The navigation directions may be output by the input/output unit 106a (see FIG. 1) and/or the display 116.

Figure 9:
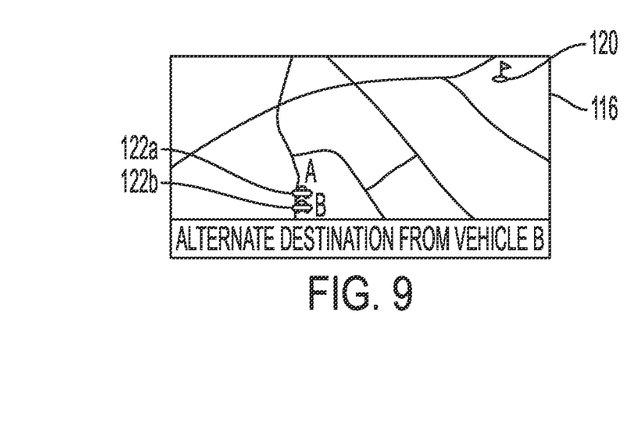
FIG. 9 illustrates the display of FIG. 4 displaying an alternate travel destination shared with the vehicle group according to an aspect of the present disclosure.

FIG. 9 illustrates the display 116 displaying an alternate travel destination shared with the vehicle group. The alternate travel destination may be proposed or set by a member vehicle in response to a previously proposed travel destination by the same member vehicle that made the previous proposal or another member vehicle. For example, a driver may want to inform the vehicle group of an alternative destination that the driver thinks is superior to a previously suggested destination and/or the driver wishes or needs the vehicle group to drive to that destination. The member vehicles that the alternative destination is being proposed to may accept or decline the alternative destination or may choose between one or more previously proposed destinations and the proposed alternative destination. If only two vehicles are present in the vehicle group and no agreement is reached, the destination suggested by the master vehicle 102a (see FIG. 1) may be the selected travel destination. Alternatively, if no agreement is reached, no particular travel destination may be selected and the vehicle group may be dissolved. If more than two vehicles are present in the vehicle group, a voting of the suggested destinations may take place. The destination that receives the majority vote may be selected as the travel destination. If there is a tie, a revote may take place, the master vehicle 102a may select the travel destination, no particular travel destination may be selected, or the vehicle group may be dissolved. The selections, voting, and/or revoting may be performed through the input/output units 106a,b (see FIG. 1) and/or the display 116 of the member vehicles of the vehicle group.

The master vehicle 102a (see FIG. 1) or the follower vehicle 102b (see FIG. 1) may be sharing the alternative travel destination with the vehicle group. The vehicle sharing the alternative travel destination is referred to as "vehicle B" in FIG. 9. The other vehicle in the vehicle group, which may be the master vehicle 102a, is referred to as "vehicle A" in FIG. 9. The current location of vehicle A and vehicle B are shown by car icons 122a,b, respectively, by example. The alternative destination is shown by a flag icon 120 in FIG. 9 as an example. The current locations of vehicle A and vehicle B, the alternate travel destination, and the second location may be overlaid over a map. In some examples, the prior suggested destination may also be displayed over the map. For instance, a different colored flag or icon may be used to indicate the prior suggested route. Hence, drivers of the member vehicles may compare and contrast all suggested travel destinations before making a selection. The map may be stored in the memory 110a (see FIG. 1), the remote server 112 (see FIG. 1), or shared with the vehicle group by a member vehicle. If the alternative travel destination is selected by the vehicle group, the ECUs of the member vehicles, such as the ECU 104a (see FIG. 1), may determine navigation directions based on the shared alternative travel destination. The navigation directions may be output by the input/output unit 106a (see FIG. 1) and/or the display 116.

Figure 10:
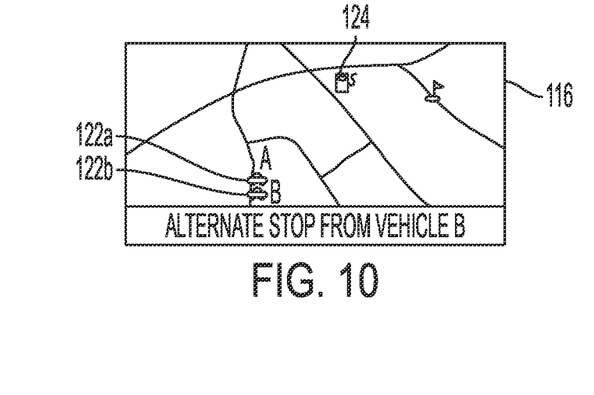
FIG. 10 illustrates the display of FIG. 4 displaying an alternate travel stop shared with the vehicle group according to an aspect of the present disclosure.

FIG. 10 illustrates the display 116 displaying an alternate travel stop shared with the vehicle group. The alternate travel stop may be proposed or set by a member vehicle in response to a previously proposed travel stop by the same member vehicle that made the previous proposal or another member vehicle. For example, a driver may want to inform the vehicle group of an alternative stop that the driver thinks is superior to a previously suggested stop and/or the drive wishes or needs the vehicle group to stop at the alternative stop. The member vehicles that the alternative stop is being proposed to may accept or decline the alternative stop or may choose between one or more previously proposed stops and the proposed alternative stop. If only two vehicles are present in the vehicle group and no agreement is reached, the stop suggested by the master vehicle 102a (see FIG. 1) may be the selected travel stop. Alternatively, if no agreement is reached, no particular travel stop may be selected and the vehicle group may be dissolved. If more than two vehicles are present in the vehicle group, a voting of the suggested stops may take place. The stop that receives the majority vote may be selected as the travel stop. If there is a tie, a revote may take place, the master vehicle 102a may select the travel stop, no particular travel stop may be selected, or the vehicle group may be dissolved. The selections, voting, and/or revoting may be performed through the input/output units 106a,b (see FIG. 1) and/or the display 116 of the member vehicles of the vehicle group.

The master vehicle 102a (see FIG. 1) or the follower vehicle 102b (see FIG. 1) may be sharing the alternative travel stop with the vehicle group. The vehicle sharing the alternative travel stop is referred to as "vehicle B" in FIG. 10. The other vehicle in the vehicle group, which may be the master vehicle 102a, is referred to as "vehicle A" in FIG. 10. The current location of vehicle A and vehicle B are shown by car icons 122a,b, respectively, by example. The alternative stop is shown by a gas station icon 124 in FIG. 10 as an example. The current locations of vehicle A and vehicle B, the alternate travel stop, and the second location may be overlaid over a map. In some examples, the prior suggested destination may also be displayed over the map. For instance, a different colored icon or a different icon may be used to indicate the prior suggested stop. Hence, drivers of the member vehicles may compare and contrast all suggested travel stops before making a selection. The map may be stored in the memory 110a (see FIG. 1), the remote server 112 (see FIG. 1), or shared with the vehicle group by a member vehicle. If the alternative travel stop is selected by the vehicle group, the ECUs of the member vehicles, such as the ECU 104a (see FIG. 1), may determine navigation directions based on the shared alternative travel stop. The navigation directions may be output by the input/output unit 106a (see FIG. 1) and/or the display 116.

Figure 11:
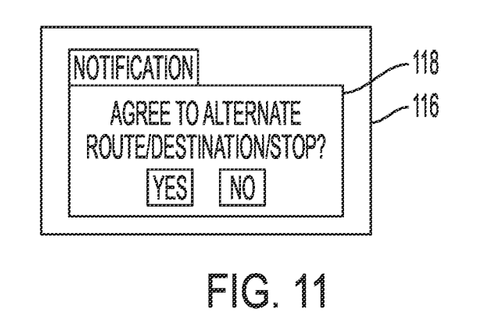
FIG. 11 illustrates the display of FIG. 4 prompting the user to agree to an alternate travel route, destination, or stop according to an aspect of the present disclosure.

FIG. 11 illustrates the display 116 prompting the user to agree to an alternate travel route, destination, or stop. For example, a notification or an option tab 118 is presented to the user where the user may choose between accepting or declining the proposed alternate route, destination, or stop by selecting "yes" or "no" options that appear on the display 116, respectively. This option tab 118 may be presented to the user prior to the navigation directions being set based on the proposed alternate route, destination, or stop. If the user elects not to accept the proposed alternate route, destination, or stop, voting, revoting, or other aforementioned procedures may be enacted.

Figure 12:
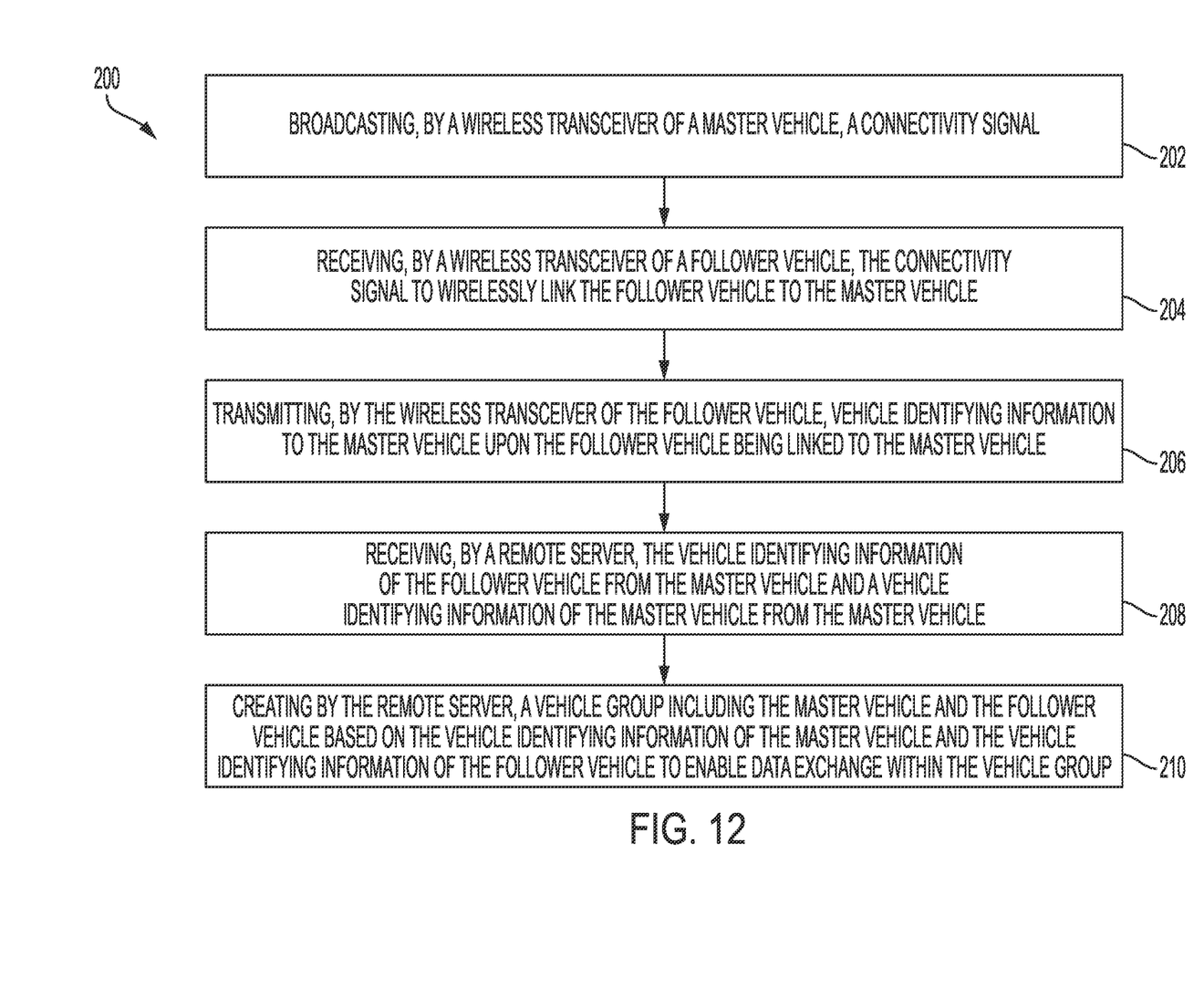
FIG. 12 illustrates a flow diagram of a method for creating a vehicle network between a master vehicle and a follower vehicle according to an aspect of the present disclosure.

FIG. 12 illustrates a flow diagram of a method 200 for creating a vehicle network between a master vehicle 102a (see FIG. 1) and a follower vehicle 102b (see FIG. 1). Some or all components of the system 100 may be utilized to carry out the steps of the method 200. The method may begin with block 202.

In block 202, the method 200 may include a wireless transceiver of the master vehicle broadcasting a connectivity signal. The connectivity signal may be a BLE beacon signal that reaches to nearby BLE compatible devices. In some embodiments, the connectivity signal may be compatible with Zigbee®, Z-Wave, 6LoWPAN, and the like. The nearby devices may then take an action in response to the connectivity signal.

In block 204, the method 200 may include a wireless transceiver of the follower vehicle receiving the connectivity signal to wirelessly link the follower vehicle to the master vehicle. The wireless transceiver of the follower vehicle may be compatible with the connectivity signal, and thus may receive the broadcasted connectivity signal. When the wireless transceiver receives the connectivity signal, the wireless transceiver of the master vehicle and the wireless transceiver of the follower vehicle may be linked. Hence, the master vehicle and the follower vehicle may be wirelessly linked.

In block 206, the method 200 may include the wireless transceiver of the follower vehicle transmitting vehicle identifying information to the master vehicle upon the follower vehicle being linked to the master vehicle. Vehicle identifying information may include a VIN number, a vehicle make and/or model, a license plate number, or a vehicle registration number by example. The vehicle identifying information may be stored in and retrieved from the memory of the follower vehicle or in a cloud server. In some embodiments, the user may be asked to provide the vehicle identifying information and provide the vehicle identifying information via the input/output unit of the follower vehicle.

In block 208, the method 200 may include a remote server receiving the vehicle identifying information of the follower vehicle from the master vehicle and a vehicle identifying information of the master vehicle from the master vehicle. In block 210, the method 200 may include the remote server creating a vehicle group including the master vehicle and the follower vehicle based on the vehicle identifying information of the master vehicle and the vehicle identifying information of the follower vehicle to enable data exchange within the vehicle group. The vehicle group may be exclusive to the member vehicles, encrypted, and require the aforementioned protocols to join.

Exemplary embodiments of the methods/systems have been disclosed in an illustrative style. Accordingly, the terminology employed throughout should be read in a non-limiting manner. Although minor modifications to the teachings herein will occur to those well versed in the art, it shall be understood that what is intended to be circumscribed within the scope of the patent warranted hereon are all such embodiments that reasonably fall within the scope of the advancement to the art hereby contributed, and that that scope shall not be restricted, except in light of the appended claims and their equivalents.

What is claimed is:

1. A system for creating a vehicle network between a master vehicle and a follower vehicle, the system comprising:

a wireless transceiver of the master vehicle configured to broadcast a connectivity signal;

a wireless transceiver of the follower vehicle configured to receive the connectivity signal to wirelessly link the follower vehicle to the master vehicle and transmit vehicle identifying information to the master vehicle upon the follower vehicle being linked to the master vehicle; and a remote server configured to receive the vehicle identifying information of the follower vehicle from the master vehicle and a vehicle identifying information of the master vehicle from the master vehicle to create a vehicle group including the master vehicle and the follower vehicle to enable data exchange within the vehicle group, the data exchange including:

a suggested travel route, a suggested travel destination, or a suggested travel stop for the vehicle group from a member of the vehicle group,     an alternate travel route, an alternate travel destination, or an alternate travel stop for the vehicle group from another member of the vehicle group in response to the suggested travel route, the suggested travel destination, or the suggested travel stop,     a plurality of votes including a vote from each member of the vehicle group indicating an acceptance or a rejection of the suggested travel route, the suggested travel destination, the suggested travel stop, the alternate travel route, the alternate travel destination, or the alternate travel stop, and     a selection, received from the master vehicle, of the suggested travel route, the suggested travel destination, the suggested travel stop, the alternate travel route, the alternate travel destination, or the alternate travel stop when the plurality of votes are tied.

2. The system of claim 1, further comprising an input/output unit of the follower vehicle configured to prompt a user of the follower vehicle to agree to share data with the vehicle group prior to the remote server including the follower vehicle in the vehicle group.

3. The system of claim 1, further comprising an electronic control unit (ECU) of the master vehicle and the follower vehicle configured to determine navigation directions based on the suggested travel route, to the suggested travel destination, or to the suggested travel stop.

4. The system of claim 3, wherein the data exchange further includes the member or the another member of the vehicle group suggesting or making a change to the suggested travel route, the suggested travel destination, or the suggested travel stop.

5. The system of claim 4, further comprising an input/output unit of the master vehicle or the follower vehicle configured to prompt a user of the master vehicle or the follower vehicle to agree to the change to the suggested travel route, the suggested travel destination, or the suggested travel stop before the ECU of the master vehicle and the follower vehicle changing the suggested travel route or the navigation directions to the suggested travel destination or the suggested travel stop.

6. The system of claim 1, wherein the data exchange further includes a voice message, further comprising an input/output unit of the master vehicle or the follower vehicle configured to receive input and output the voice message.

7. The system of claim 1, wherein the data exchange further includes the member of the vehicle group sharing a current location with the vehicle group, further comprising a display of the master vehicle or the follower vehicle configured to display the current location.

8. A vehicle comprising:

a memory configured to store vehicle identifying information of the vehicle; and a wireless transceiver configured to:

broadcast a connectivity signal receivable by a wireless transceiver of a second vehicle to wirelessly link the second vehicle to the vehicle,     receive vehicle identifying information from the second vehicle upon the second vehicle being linked to the vehicle,     transmit the vehicle identifying information of the second vehicle and the vehicle identifying information of the vehicle to a remote server to create a vehicle group including the vehicle and the second vehicle, and     exchange data within the vehicle group, the data including:

a suggested travel route, a suggested travel destination, or a suggested travel stop for the vehicle group from a user of the vehicle,         an alternate travel route, an alternate travel destination, or an alternate travel stop for the vehicle group from a user of the second vehicle in response to the suggested travel route, the suggested travel destination, or the suggested travel stop,         a plurality of votes including a vote from each member of the vehicle group indicating an acceptance or a rejection of the suggested travel route, the suggested travel destination, the suggested travel stop, the alternate travel route, the alternate travel destination, or the alternate travel stop, and         a selection, by the user of the vehicle, of the suggested travel route, the suggested travel destination, the suggested travel stop, the alternate travel route, the alternate travel destination, or the alternate travel stop when the plurality of votes are tied.

9. The vehicle of claim 8, wherein a digital agreement to share data within the vehicle group is required by at least the second vehicle before the remote server creating the vehicle group.

10. The vehicle of claim 8, further comprising an input/output unit configured to receive user input of the suggested travel route, the suggested travel destination, or the suggested travel stop for the vehicle group and an electronic control unit (ECU) coupled to the input/output unit and configured to determine navigation directions based on the suggested travel route, to the suggested travel destination, or to the suggested travel stop, wherein an ECU of the second vehicle determines navigation directions based on the suggested travel route, to the suggested travel destination, or to the suggested travel stop.

11. The vehicle of claim 10, wherein the data further includes the user of the vehicle suggesting or making a change to the suggested travel route, the suggested travel destination, or the suggested travel stop.

12. The vehicle of claim 11, wherein a digital agreement to the change to the suggested travel route, the suggested travel destination, or the suggested travel stop is required by at least the second vehicle before the ECU of the vehicle and the ECU of the second vehicle change the suggested travel route or the navigation directions to the suggested travel destination or the suggested travel stop.

13. The vehicle of claim 8, further comprising an input/output unit configured to receive input and output a voice message, wherein the data further includes the voice message.

14. The vehicle of claim 8, wherein the data further includes a current location of the vehicle and the second vehicle, further comprising a display configured to display the current location of the vehicle and the second vehicle.

15. A method for creating a vehicle network between a master vehicle and a follower vehicle, the method comprising:
- broadcasting, by a wireless transceiver of the master vehicle, a connectivity signal to a wireless transceiver of the follower vehicle to wirelessly link the follower vehicle to the master vehicle;
- receiving, by the wireless transceiver of the master vehicle, vehicle identifying information of the follower vehicle upon the follower vehicle being linked to the master vehicle;
- transmitting, by the wireless transceiver of the master vehicle, the vehicle identifying information of the follower vehicle and a vehicle identifying information of the master vehicle to a remote server;
- creating, by the remote server, a vehicle group including the master vehicle and the follower vehicle based on the vehicle identifying information of the master vehicle and the vehicle identifying information of the follower vehicle to enable data exchange within the vehicle group,
- receiving, by an input/output unit of the master vehicle, a suggested travel route, a suggested travel destination, or a suggested travel stop for the vehicle group,
- receiving, by an input/output unit of the follower vehicle, an alternate travel route, an alternate travel destination, or an alternate travel stop for the vehicle group in response to the suggested travel route, the suggested travel destination, or the suggested travel stop,
- receiving, by the remote server, a plurality of votes including a vote from each member of the vehicle group indicating an acceptance or a rejection of the suggested travel route, the suggested travel destination, the suggested travel stop, the alternate travel route, the alternate travel destination, or the alternate travel stop, and
- receiving, by the remote sever and from the master vehicle, a selection of the suggested travel route, the suggested travel destination, the suggested travel stop, the alternate travel route, the alternate travel destination, or the alternate travel stop when the plurality of votes are tied.

16. The method of claim 15, further comprising determining, by an electronic control unit (ECU) of the master vehicle or the follower vehicle, navigation directions based on the suggested travel route, to the suggested travel destination, or to the suggested travel stop.

17. The method of claim 16, further comprising suggesting or performing, by the input/output unit of the master vehicle or the follower vehicle, a change to the suggested travel route, the suggested travel destination, or the suggested travel stop.

18. The method of claim 17, further comprising prompting, by the input/output unit of the master vehicle or the follower vehicle, a user of the master vehicle or the follower vehicle to agree to the suggested travel route, the suggested travel destination, or the suggested travel stop or suggested or performed change to the suggested travel route, the suggested travel destination, or the suggested travel stop.

* * * * *